United States Patent [19]

Takahashi et al.

[11] Patent Number: 5,680,500

[45] Date of Patent: Oct. 21, 1997

[54] RECORD BEARING MEDIUM FOR STILL VIDEO SIGNAL

[75] Inventors: Koji Takahashi; Yoshitake Nagashima, both of Kanagawa-ken; Yuji Imamura, Tokyo, all of Japan

[73] Assignee: Canon Kabushiki Kaisha, Tokyo, Japan

[21] Appl. No.: 993,134

[22] Filed: Dec. 18, 1992

Related U.S. Application Data

[62] Division of Ser. No. 863,527, Apr. 3, 1992, abandoned, which is a continuation of Ser. No. 702,108, May 15, 1991, abandoned, which is a division of Ser. No. 235,904, Aug. 24, 1988, abandoned.

[30] Foreign Application Priority Data

| Aug. 28, 1987 | [JP] | Japan | 62-212994 |
|---|---|---|---|
| Sep. 4, 1987 | [JP] | Japan | 62-220241 |
| Sep. 4, 1987 | [JP] | Japan | 62-220242 |
| Sep. 4, 1987 | [JP] | Japan | 62-220243 |
| Sep. 7, 1987 | [JP] | Japan | 62-222026 |
| Sep. 7, 1987 | [JP] | Japan | 62-222027 |
| Sep. 7, 1987 | [JP] | Japan | 62-222028 |
| Sep. 7, 1987 | [JP] | Japan | 62-222029 |
| Sep. 7, 1987 | [JP] | Japan | 62-222030 |
| Oct. 19, 1987 | [JP] | Japan | 62-261785 |

[51] Int. Cl.$^6$ .............................. H04N 5/76; H04N 5/84
[52] U.S. Cl. ........................... 386/95; 386/106; 386/96
[58] Field of Search ....................... 358/335, 341, 358/343, 342; 360/33.1, 32, 19.1; 386/96, 95, 104, 105, 106; H04N 5/76

[56] References Cited

U.S. PATENT DOCUMENTS

| 4,703,369 | 10/1987 | Moriyama et al. | 358/343 |
|---|---|---|---|
| 4,942,551 | 7/1990 | Klappert et al. | 360/32 |
| 5,046,004 | 9/1991 | Tsumura et al. | 360/32 |
| 5,062,097 | 10/1991 | Kumaoka | 358/335 |

*Primary Examiner*—Khoi D. Truong
*Attorney, Agent, or Firm*—Robin, Blecker, Daley & Driscoll

[57] ABSTRACT

A sheet-shaped record bearing medium having a first recording area for recording a fixed amount of information and a second recording area for recording a variable amount of information, a still video signal being recorded in the first recording area and a time-serial signal being recorded in the second recording area.

12 Claims, 14 Drawing Sheets

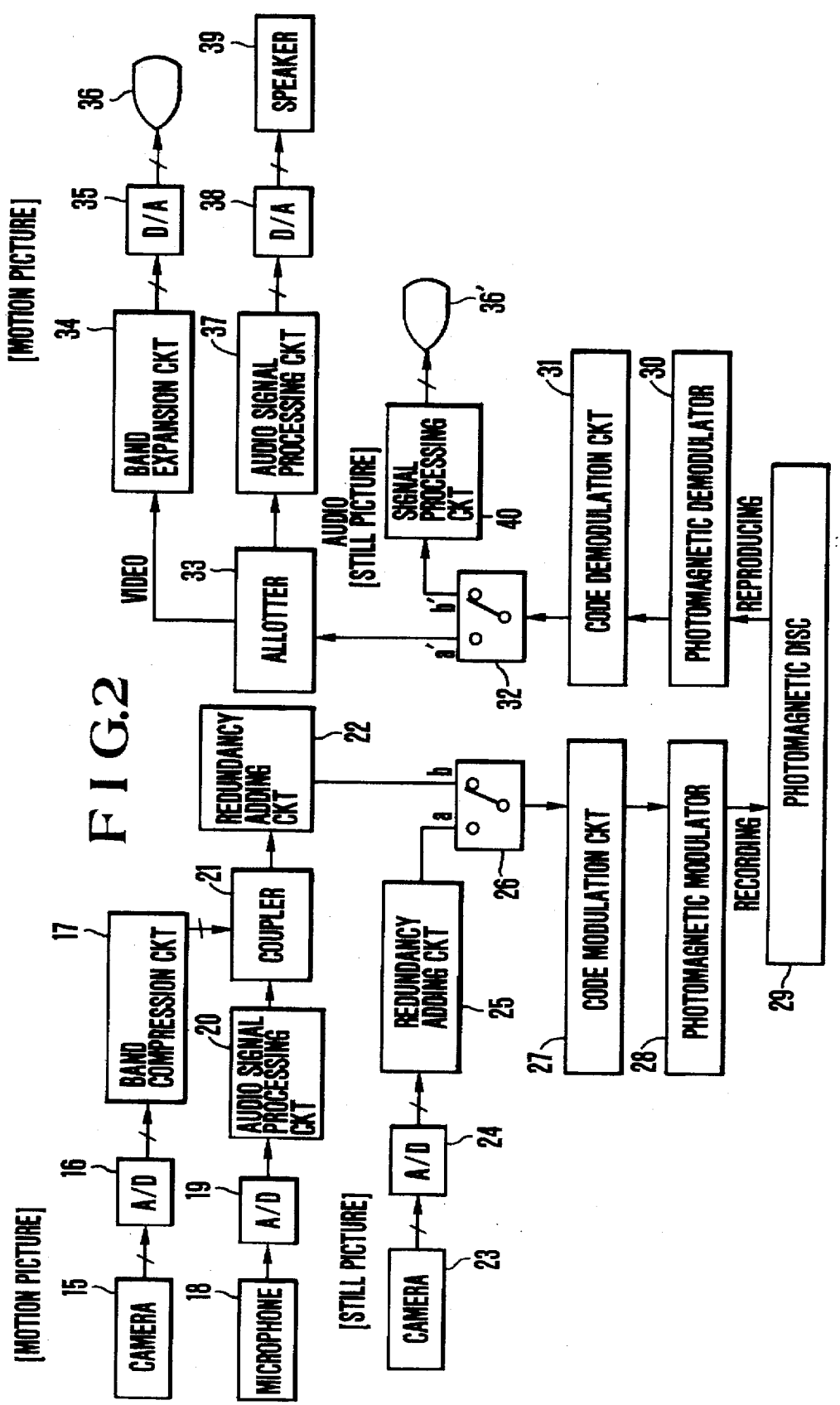

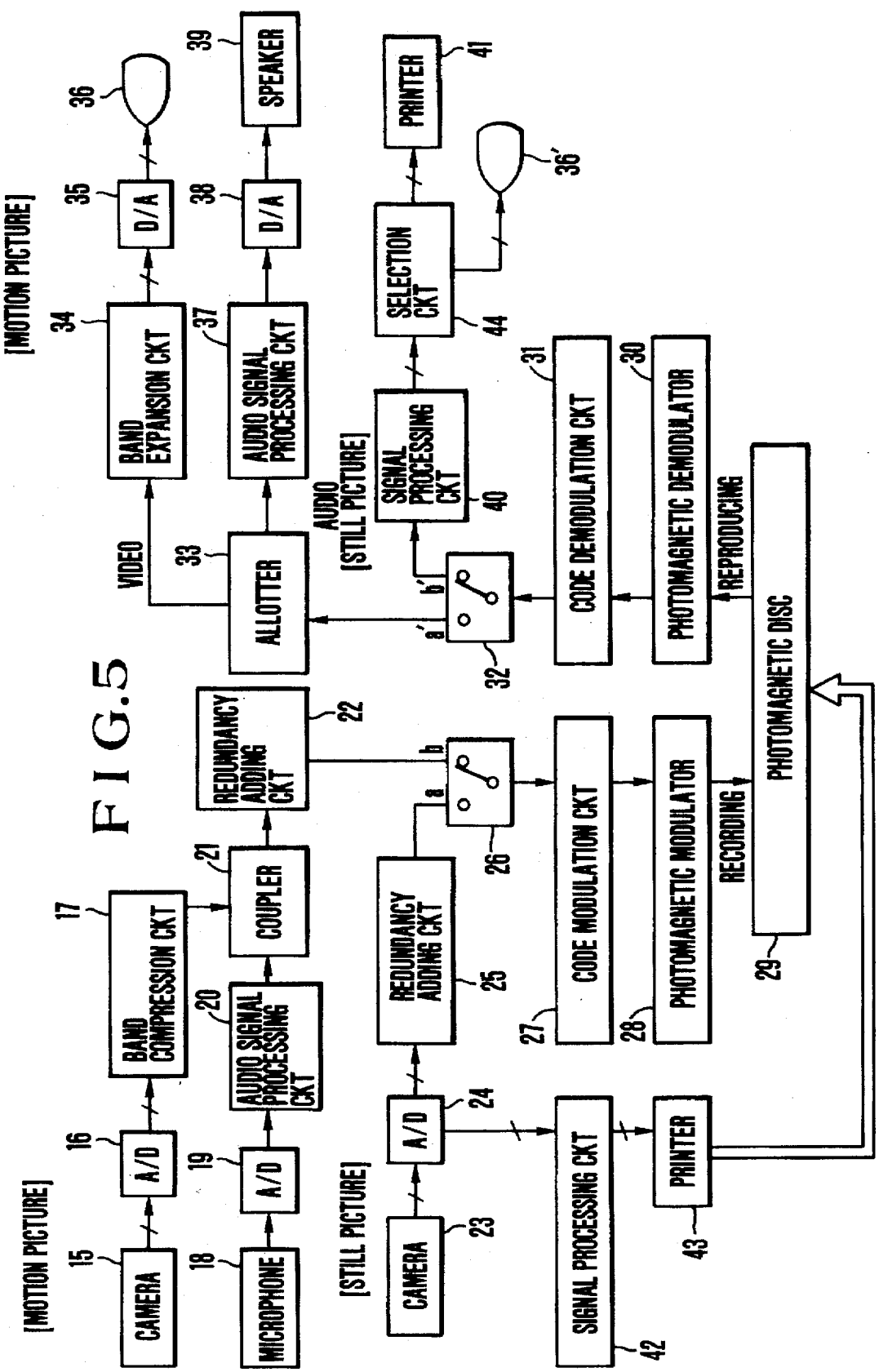

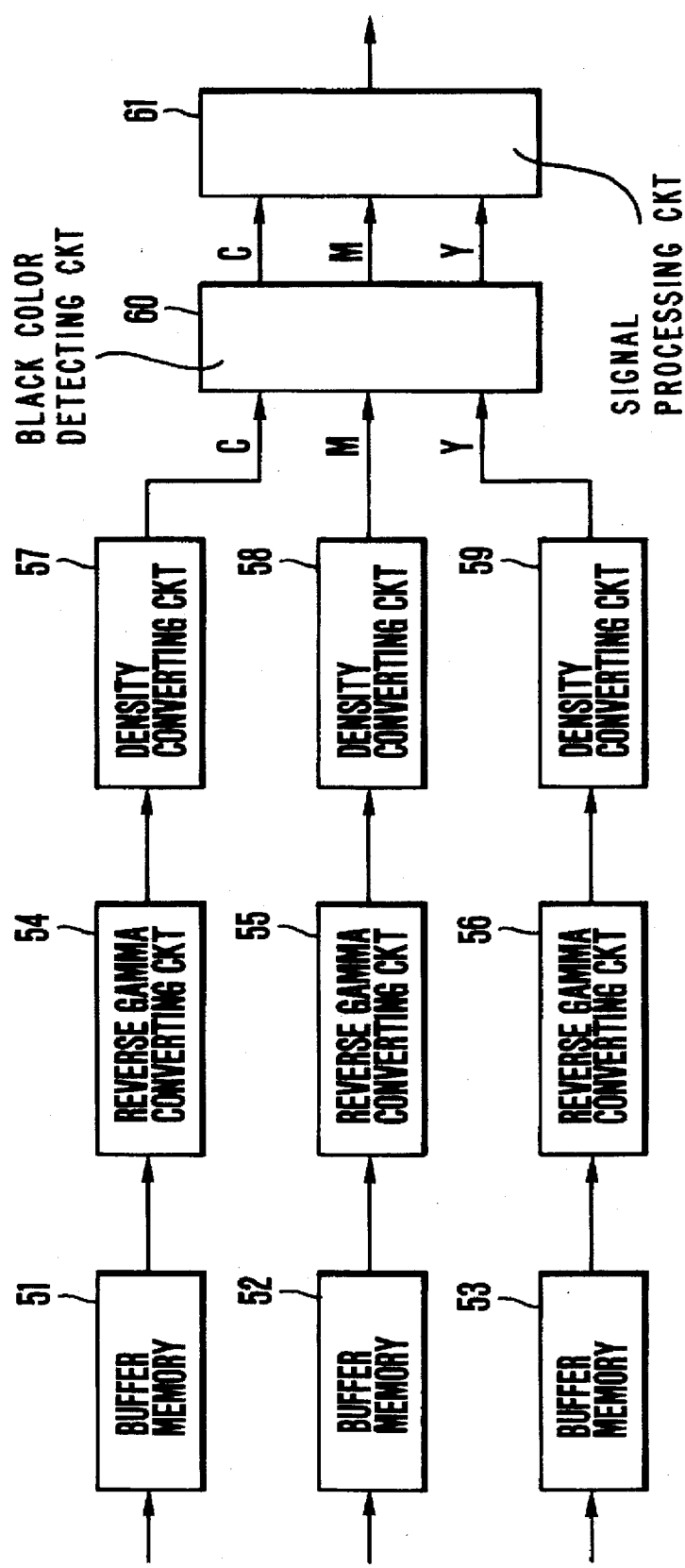

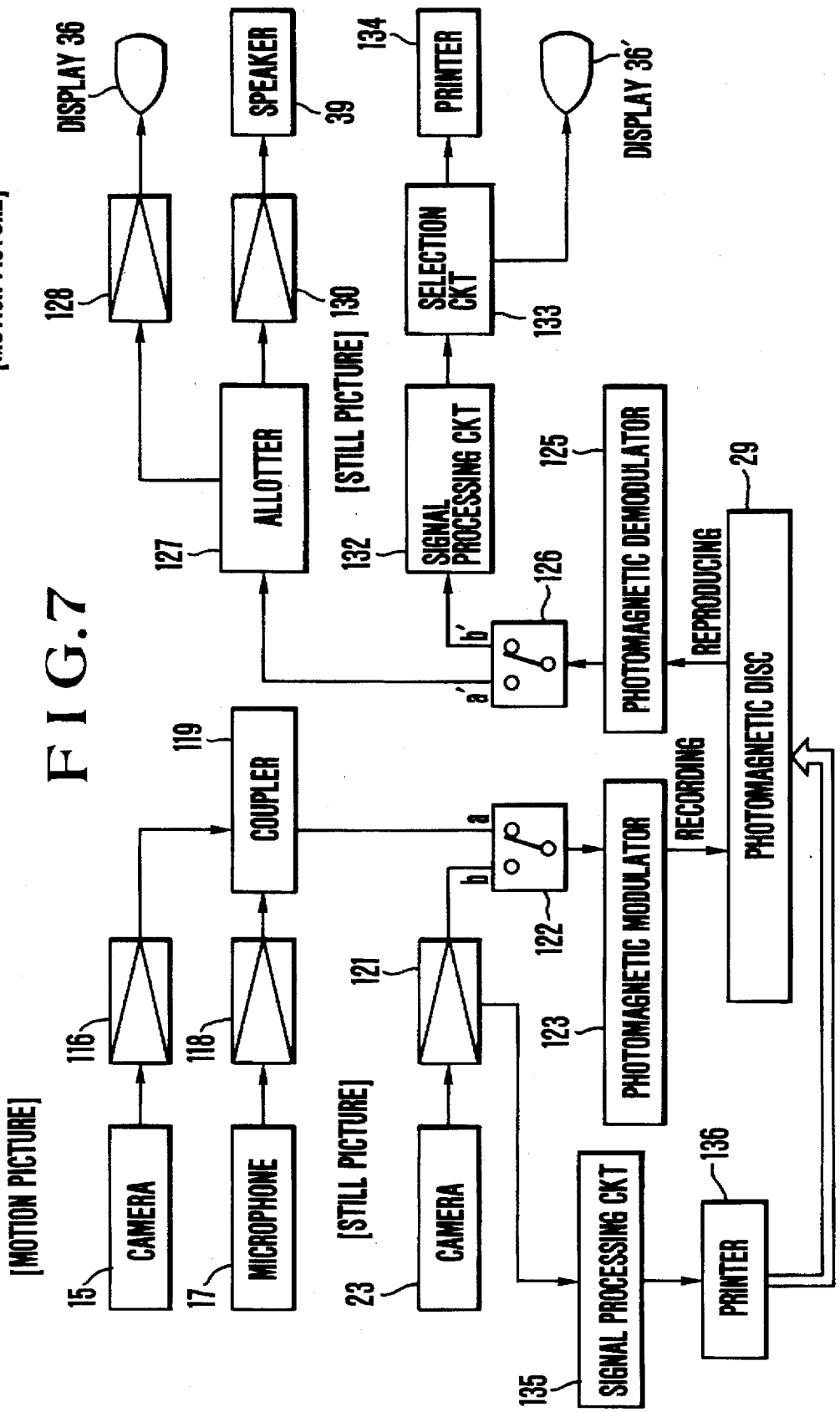

(a) Te AMORPHOUS (ALKYL)
(b) Te CRYSTAL
(c) HOLE (BIT)

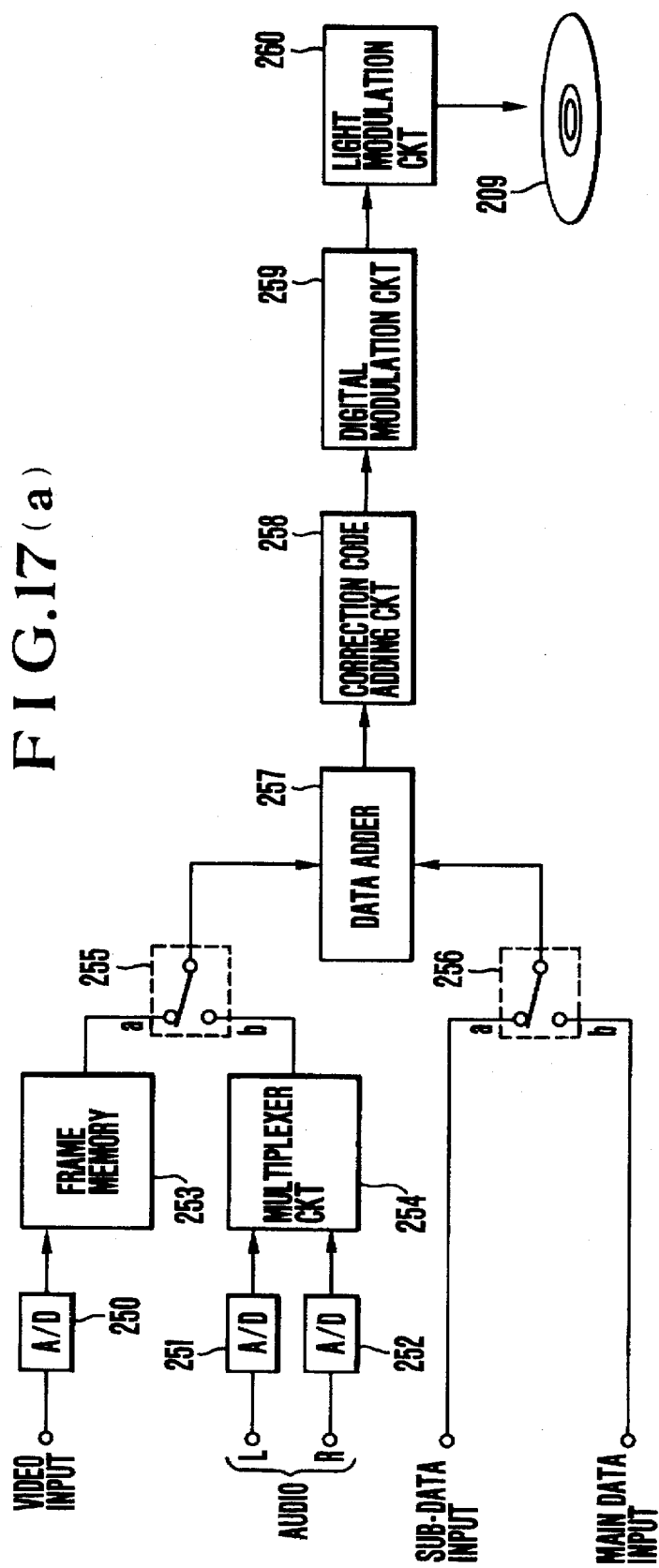

RECORD BEARING MEDIUM FOR STILL VIDEO SIGNAL

This application is a division of application Ser. No. 863,527, filed Apr. 3, 1992, now abandoned, which is a continuation of application Ser. No. 702,108, filed May 15, 1991, now abandoned, which is a divisional of Ser. No. 235,904, filed Aug. 24, 1988, now abandoned.

BACKGROUND OF THE INVENTION

1. Field of the Invention:

This invention relates to record bearing media and, more particularly, to recording media on which still pictures and time-serial information relevant to the still pictures are to be recorded.

2. Description of the Related Art:

At present, in case of preserving the record of scenes not only in the daily living but also at memorial functions, etc. in the form of images, there are occasions of using VTRs for motion pictures and accompanying sounds and still video recorders and silver halide cameras for still pictures.

Also, of the conventional record bearing media there are video discs such as laser disc and VHD. With such media, motion picture information of 30 minutes to a few hours is recorded in only one item. In application to, for example, still pictures, for the NTSC system of about 1,800 frames a minute, or for the high-definition television of about 360 frames a minute, it is, therefore, possible to store as many still pictures as ten thousand to two hundred thousand in one item of the recording medium. There is another system called "AHD" wherein the still image before to be recorded in the disc-shaped medium is changed to digital code.

In the prior known information recording media of the type described above, an enormous volume of data could be recorded in one item of the recording medium. On its reverse side, however, this enormous volume of data had its arrangement made complicated, giving rise to a number of problems that it was difficult to swiftly reproduce an actually necessary small amount of information, that the information was hardly controlled, and that the size was too large to carry around conveniently.

Also, to handle the signals including the dimension of time such as video signals for motion picture, the accompanying audio signals and other time-serial signals together with signals having no time factor or the still image information, great difficulty arose with the conventional recording medium.

Also, situations in which the record has to be rewritten to suit to special purpose, or permanent preservation is necessary problems are encountered. It is, therefore, desired to develop a medium for still image files which can cope with a wide variety of purposes as such.

The video discs that have so far been used were obtained by many recording methods. As to the reproducing means too, various reproduction capabilities suited to them have been considered.

As such a medium is in either of the forms that is possible to rewrite and that is impossible to rewrite, it is also generally desirable to selectively use both of them depending on the given situation.

On the contrary, because the conventional reproduction apparatus differ with different recording methods as has been described above, for the optical discs of different recording methods are reproduced, the reproduction apparatus adapted to the recording methods must be set up on all such occasions. However, the conventional reproduction apparatus are out of compatibility. Hence there was a problem that depending on the sort of record bearing medium used, a choice among the different reproduction apparatus had to be made.

Also, to deal with the picture on the record bearing medium, the treatment differs largely between the video signal as was recorded original and the once or more copied one. Therefore, it is desired that if the given record bearing medium is not original, then the number of generations the copy is of, becomes possible to determine.

SUMMARY OF THE INVENTION

An object of the present invention is to eliminate the above-described problems.

Another object is to provide a record bearing medium capable of dealing the still picture information and the time-serial information both in a good efficiency.

Under such an object, in an embodiment of the invention, a sheet-shaped record bearing medium is proposed, comprising a first recording area in which a fixed amount of information is always recorded, the first recording area having a still image signal recorded therein, and a second recording area in which an amount of recorded information is not constant, the second recording area having a time-sequential signal recorded therein.

Still another object of the invention is to provide a record bearing medium suited to set up various systems which are relevant to still pictures.

Under such an object, in an embodiment of the invention, a sheet-shaped record bearing medium is proposed, comprising a first recording area in which a fixed amount of information is always recorded, the first recording area having a still image signal recorded therein, and a second recording area in which an amount of recorded information is not constant, the second recording area having recorded therein a time-sequential control signal for time-sequentially controlling an apparatus connected to a reproduction apparatus for reproduction from the record bearing medium.

A further object of the invention is to provide a record bearing medium of which the handling method the user can readily understand.

Under such an object, in an embodiment of the invention, a sheet-shaped record bearing medium is proposed, comprising a first recording area in which a fixed amount of information is always recorded, the first recording area having recorded therein a still image signal and data representing the number of copy generations of the record bearing medium, and a second recording area in which an amount of recorded information is not constant, the second recording area having a time-sequential signal recorded therein.

Other objects of the invention than those described above and its features will become apparent from the following detailed description of embodiments thereof by reference to the drawings.

BRIEF DESCRIPTION OF THE DRAWINGS

FIG. 2 is a diagram illustrating an example of construction of a recording and reproduction system using the record bearing medium of FIG. 1.

FIG. 5 is a diagram illustrating an example of construction of a recording and reproduction system using the record bearing medium of FIGS. 3 and 4.

FIG. 6 is a block diagram of an example of construction of the signal processing circuit in the printer of FIG. 5.

FIG. 7 is a diagram of another example of construction of the recording and reproduction system using the record bearing medium of FIG. 3.

FIGS. 17(a) and 17(b) are a block diagram illustrating a practical arrangement of the parts of the signal processing circuit of FIG. 15.

DETAILED DESCRIPTION OF THE PREFERRED EMBODIMENTS

Figure 1:
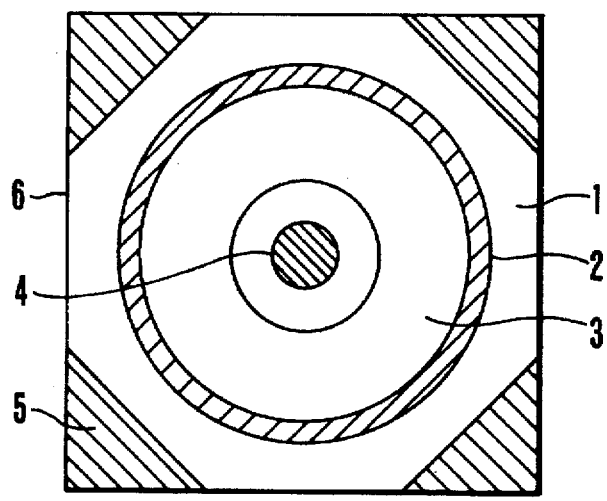
FIG. 1 is a top view of the recording surface of an embodiment of a record bearing medium according to the invention.

FIG. 1 shows the back side (recording surface) of an optical disc for recording motion picture - still pictures, which constitutes one embodiment of the invention. In FIG. 1, 1 is a protection layer; 2 is a first area in which a fixed quantity of information is always recorded, or that area which records still pictures. 3 is a second area in which the record information quantity is variable, or that area which records information other than the still pictures, for example, motion pictures. 4 is a recessed portion for indicating the center of the disc and fixedly Securing the disc when the disc rotates by a driver device. 5 are projections for fixing the disc at the time of rotation. 6 is the recording surface on the back side of the disc.

Also, FIG. 2 is a block diagram illustrating a system for digital recording (picture recording, sound recording) and reproduction using the disc shown in FIG. 1. The system comprises a camera 15 for generating motion picture signals to be recorded in the second area, an analog-to-digital A/D) converter 16, a band compression circuit 17 for compressing the information quantity, a microphone 18 for inputting the sound the motion picture accompanies, an A/D converter 19 which is for sound, an audio signal processing circuit 20 for treating digital audio data, a coupler 21 for coupling the motion picture and accompanying sound to form signals of one system, a redundancy adding circuit 22 for correcting error, a camera 23 which generates still picture signals to be recorded in the first area, an A/D converter 24 which is for the still picture signals, a redundancy adding circuit 25 for correcting error, a selection circuit 26 for producing one of the still picture and the motion picture that is the information other than the still picture a code modulation circuit 27 for digital modulation, a photomagnetic modulator 28 using the magneto-optical effect for recording digital signals on a photomagnetic disc 29, a photomagnetic demodulator 30 using the magneto-optical effect, a code demodulator 31 for demodulating the digital data, a selection circuit 32 for outputting the still picture and the motion picture in differentiation, an allotter 33 for separating the video signal and the audio signal, a band expansion circuit 34 for expanding the data amount of the recorded digital data, a digital-to-analog (D/A) converter 35 for converting the digital data to the analog data, a display 36 such as CRT for projecting a motion picture, an audio signal processing circuit 37 for the audio data separated by the allotter 33, a D/A converter 38 for converting the digital audio data to the analog form, a speaker 39 for producing sound, and a signal processing circuit 40.

In FIG. 2, the motion picture camera 15 when shooting produces video data or analog data which are then converted to digital data of the motion picture by using the A/D converter 16. And, using the band compression circuit 17, the digital data of that motion picture is compressed. Also, when shooting the camera 15, the accompanying sound (other sounds such as background music (B.G.M.) will do good) enters the microphone 18. Its audio signals, or analog data, are converted to audio digital data by using the A/D converter 19. And, its audio digital data after having been digitally treated in the signal processing circuit 20 are coupled with the motion picture digital data produced from the band compression circuit 17 by the time division multiplex or like method in the coupler 21. In the redundancy adding circuit 22, a redundancy code for error correction is then added. Next, a video signal as the still picture shot by the still picture camera 23 is made to be a digital data of the still picture by the A/D converter 24. And, in the redundancy adding circuit 25, a redundancy code for error correction is added. Next, the switch, of the selection circuit 26 is thrown to a terminal b side so that the digital data comprising the motion picture and sound from the circuit 22 are code-modulated by using the code modulation circuit 27. And, the motion picture, sound digital data are recorded through the photomagnetic modulator 28 using the magneto-optical effect to the motion picture recording area 3 of FIG. 1. Also, the switch of the selection circuit 26 is thrown to a terminal a side so that the still picture digital data that are the output of the redundancy adding circuit 25 are recorded, similarly to the motion picture sound digital data, through the code modulation circuit 27 and the photomagnetic modulator 28 to the still picture recording area 2 (FIG. 1) on the photomagnetic disc 29. Thus, the still picture, the motion picture and the sound are digitally recorded on one item of disc.

Next, reproduction is described. At first, in the photomagnetic demodulator 30 using the magneto-optical effect, the motion picture, still picture, sound data on the photomagnetic disc 29 are read. Then, the modulated digital data is demodulated by the code demodulation circuit 31 to the original signals. And, with the switch of the selection circuit 32 thrown to a terminal "a'" side, the motion picture, sound digital data are caused to enter the allotter 33 wherein the sound digital data and the motion picture digital data are separated. Then, the data of the motion picture enters the band expansion circuit 34, wherein the digital data is expanded. Then, the expanded data is converted to analog data by the D/A converter 35 and output as the motion picture in the CRT of the display 36.

Also, the sound digital data output from the allotter 33 is supplied through the audio signal processing circuit 37 to the D/A converter 38, and is output as the analog data or sound from the speaker 39 in the synchronized form with the motion picture produced from the CRT of the display 36. Next, with the switch of the selection circuit 32 thrown to a terminal "b'" side, the still picture digital data is caused to enter the signal processing circuit 40 to be output to the CRT of the display 36'.

By the foregoing operation, the digital data comprising the motion picture, still picture and sound on the photomagnetic disc is output to the CRT, printer and speaker.

It should be noted that, in the above-described system, the motion picture and the still picture have been input from the different sources from each other by using the respective individual cameras, but if the motion picture camera is improved in the image pickup power and made able to record one frame of picture by a frame memory, one scene of the motion picture can be recorded as a still picture by using such a motion picture camera.

The above-described information recording medium can record still pictures and other classes of information other than that of still pictures in one item of disc, so that there is a merit that the ability to search from one class to another is excellent and the control of information is easy to perform.

Figure 3:
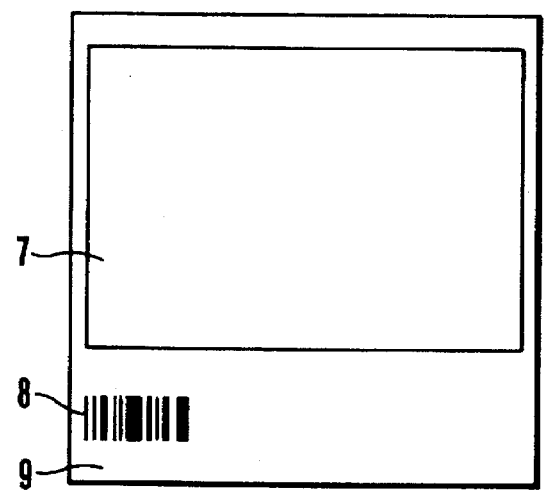
FIG. 3 is a plan view looked from one side of another embodiment of the record bearing medium according to the invention.
Figure 4:
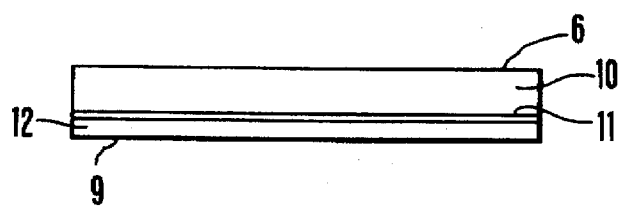
FIG. 4 is a sectional view of the record bearing medium of FIG. 3.

Next, a photomagnetic disc as another embodiment of the invention is described. The back surface (recording surface) of the photomagnetic disc of this embodiment is the same as shown in FIG. 1. FIG. 3 is a view illustrating the front surface (print surface) of the photomagnetic disc of this embodiment. FIG. 4 is a sectional view of the photomagnetic disc shown in FIG. 3. In FIGS. 3 and 4, 6 is a record bearing surface that is the back surface of the disc; 7 is a print of still picture printed out; 8 is a bar code for use in arrangement of the disc. As shown in FIG. 3, the bar code 8 is provided at the center of the lower margin or one of the corners of the print surface 9. 9 is the print surface that is the front surface of the disc. 10 is a protection layer. 11 is a record layer. 12 is a print layer.

Also, FIG. 5 is a block diagram illustrating a system for recording (picture recording, sound recording), reproduction using the disc shown in FIGS. 1, 3, 4. In the figure, the similar parts to those of FIG. 2 are denoted by the same numerals and their explanation is omitted.

In FIG. 5, 41 is a printer for printing Out the processed digital still picture data in the signal processing circuit 40 on a sheet of paper, or a medium other than that directly by ink; 42 is a signal processing circuit similar to the signal processing circuit 40; 43 is a printer similar to the printer 41; 44 is a selection circuit for selecting whether to print out or to present, as it is, the still picture at the display 36'.

In the system of FIG. 5, similarly to the system of FIG. 2, the digital data comprising the motion picture, still picture, sound on the photomagnetic disc is output to the CRT, printer, speaker. Also, in order that what is recorded in this disc is quickly understandable, a still picture as the print 7 of FIG. 3 is affixed. For this purpose, the data from the A/D converter 24 is digitally treated in the signal processing circuit 42, and printed out on paper in the printer 43. As shown in FIG. 3, it is affixed to the front surface of the disc which is the print surface 9. This print may be a picture obtained by printing out the still picture data input from the selection circuit 44 to the printer 41.

FIG. 6 is a block diagram of a practical example of the circuit structure for signal treatment in the interior of the printer 41 or 43 in FIG. 5. 51, 52 and 53 are buffer memories; 54, 55 and 56 are reverse gamma converting circuits for R signal, G signal, B signal respectively; 57, 58 and 59 are density converting circuits for printer; 60 is a black color detecting circuit; and 61 is a printer output signal processing circuit.

The digital signals of R, G, B from the signal processing circuit 40 or 42 are converted in the data rate by the buffer memories 51, 52 and 53. Next, in the reverse gamma converting circuits 54, 55 and 56, the gamma correction applied signals are returned to the original signals (linear signals). In the NTSC signal, on the transmitter side, the non-linear treatment in conformance to the non-linear characteristics of the fluorescent surface, or the γ correction, is carried out. Therefore, the correction circuits of 1/γ or the reverse gamma converting circuits 54, 55 and 56 become necessary. But, in the case that this γ correction is carried out on the receiver side, the reverse gamma converting circuits 54, 55 and 56 become unnecessary. And, by the density converting circuits 57, 58 and 59 for the printer the R, G, B signals of the additive color process are converted to three primary colors C, M, Y of the subtractive color process having the reference of white color, and density correction is carried out to bring fourth gradation when to print. Next, in the black (BL) detecting circuit 60, BL is formed from the three colors C, M, Y. And, in the signal processing circuit 61, the four colors C, M, Y, BL are signal-processed appropriately to suit to the printer, and its output is printed out.

The above-described information record bearing medium has the still picture and information other than the still picture recorded in one sheet of disc, and further has on its opposite surface a picture concerning the still picture. Therefore, there is a merit that the information is easy to control and to search.

FIG. 7 is a block diagram illustrating another arrangement of the system using the disc shown in FIGS. 1, 3 and 4. In the figure, the similar constituent parts to those of FIG. 5 are denoted by the same numerals.

In FIG. 7, 116 is an amplifier for amplifying the analog video signal obtained from the camera 15; 118 is an amplifier for amplifying the analog audio signal obtained from the microphone 17; 119 is a coupler for coupling the motion picture signal and the audio signal to form a signal of one system; 121 is an amplifier for amplifying the analog still picture signal obtained from the camera 23; 122 is a selection circuit for selecting one of the analog motion picture signal and the still picture signal to produce at its output; 123 is a photomagnetic modulator using the magneto-optical effect for recording the signal on the photomagnetic disc 29; 125 is a photomagnetic demodulator using the magneto-optical effect; 126' is a selection circuit for selectively producing the analog still picture signal or the analog motion picture signal; 127 is an allotter for separating the analog motion picture signal and the analog audio signal; 128 and 130 are amplifiers for amplifying the analog motion picture signal and the audio signal; 132 is a signal processing circuit for the analog still picture signal; 133 is a selection circuit for selecting whether the still picture signal is produced to the display 36' or produced to the printer 134.

In the circuit of FIG. 7, the analog video signal produced by the motion picture camera 15 is amplified by the amplifier 116, and the analog audio signal from the microphone 17 is amplified by the amplifier 118. The signals from these amplifiers 116 and 118 are coupled by the time division multiplex or like method in the coupler 119. Next, the analog still picture signal obtained by the camera 23 for still picture is amplified by the amplifier 121. And, the switch of the selection circuit 122 is thrown to the terminal "a" side, so that the analog signal comprising the motion picture and sound passes through the photomagnetic modulator 123 using the magneto-optical effect and is recorded in the recording area 3 of the photomagnetic disc of FIG. 1. Also, the switch of the selection circuit 122 is thrown to the terminal "b" side, so that the analog still picture signal that is the output from the amplifier 121 passes through the photomagnetic modulator 123 and is recorded on the still picture recording area 2 on the photomagnetic disc 29.

Next, reproduction is described. At first, each signal of the motion picture, still picture and sound is obtained from the analog signal from the photomagnetic disc 29 by the photomagnatic demodulator 125 using the magneto-optical effect. And, on throwing the selection circuit 126 to the terminal "a'" side, the motion picture and audio signals are supplied to the allotter 127 wherein the audio signal and the motion picture signal are separated. The motion picture signal passes through the amplifier 128 and is output as the motion picture to the CRT or like display 36. Also, the audio signal produced from the allotter 127 passes through the amplifier 130 and is output as the sound from the speaker 39 in the synchronized timing with the motion picture the display 36 produces. Next, on setting the output of the selection circuit 126 to the terminal "b'" side, the still picture signal is caused to enter the signal processing circuit 132. Further by the selection circuit 133, it is input to the display 36' or the printer 134 for printout.

Also, for quick understanding of what is recorded in this photomagnetic disc, to affix the still picture as the print 7, it is treated by the signal processing circuit 135, and printed out by the printer 136. The printout is affixed to the print surface 9 of the disc like that shown in FIG. 3. This print may be the one printed out from the printer 134.

Figure 8A:
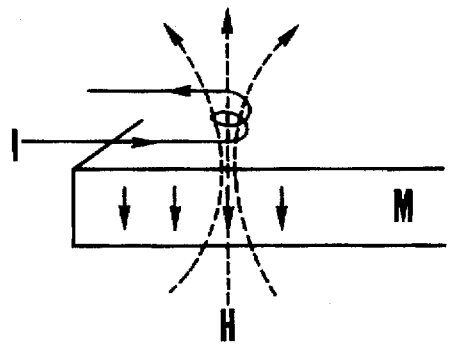
FIGS. 8(a), 8(b) and 8(c) are diagrams to explain the recording method using the magneto-optical effect.
Figure 8B:
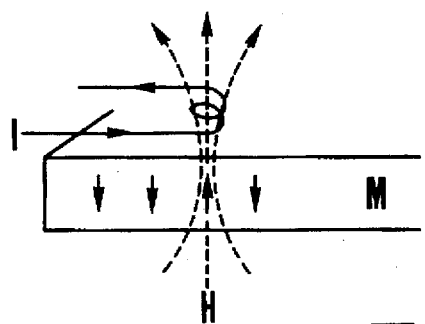
Figure 8C:
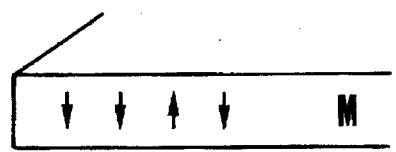

Next, the process for performing recording on the photomagnetic disc by using the magneto-optical effect is described by using FIGS. 8(a), 8(b) and 8(c). As the material of the disc, the disk is fabricated by sputtering TbFeCo, TbDyFeCo is widely used. In these ferromagnetic materials, when the temperature is increased, the fluctuation of the magnetic moment of the atoms becomes strong, and the magnetization lowers. By utilizing this phenomenon, the magnetization is inverted to effect recording. For this, a weak magnetic field H is given in a direction desired to record as shown in FIG. 8(a). Then, as shown in FIG. 8(b), a laser beam is irradiated at where the operator wants to write and the temperature of that place is increased. As a result, as shown in FIG. 8(c), the magnetization M of the record bearing medium is inverted by the magnetic field H. After the irradiation of the beam, the recording is fixed in the form of the difference in the direction of magnetization.

So, reproduction is carried out by reading this difference of the direction of magnetization. In this reproduction, the magneto-optical effect is used. That is, the linearly polarized light (the light that is so polarized that the direction of the electric field vector is always constant) advances in the magnetic material, thereby rotating the polarization plane. This phenomenon is called Faraday effect. The angle of rotation of this time is called Faraday rotation angle. Also, when the direction of magnetization is reversed, the polarization plane rotates to the opposite direction. This phenomenon in terms of the reflected light is called Kerr effect. The angle of rotation of this time is called Kerr rotation angle.

Figure 9A:
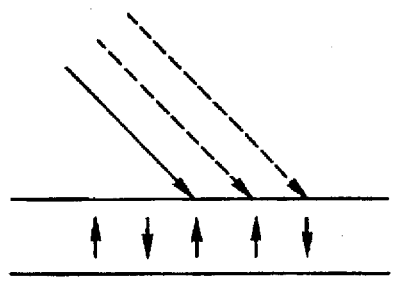
FIGS. 9(a), 9(b) and 9(c) are diagrams to explain the method of reproducing the record bearing medium by using the magneto-optical effect.
Figure 9B:
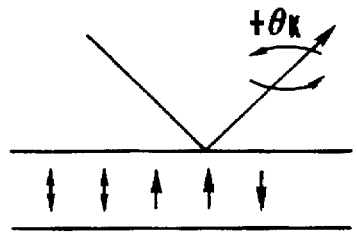
Figure 9C:
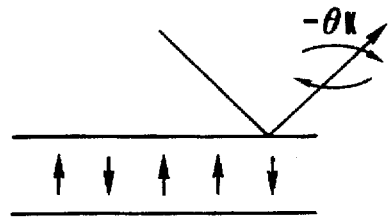

A case where the record bearing medium on which a signal has been recorded by using the magneto-optical effect is subject to a preproduction of the signal by using the above-described Kerr effect is described by using FIGS. 9(a)–9(c).

A laser beam for reading is irradiated on the record bearing medium as shown in FIG. 9(a). Next, when the reflected laser beam is looked through an analyzer as shown in FIGS. 9(b) and 9(c), the difference of rotation between (+) (FIG. 9(b)) and (−) (FIG. 9(c)) appears as a difference in intensity of the light. Hence, the data can be reproduced by the two logic values of (+) and (−).

Next, a light recording method of forming the difference of the intensity of reflection in the recording medium is described. In this case, the material of the record bearing medium may be, for example, of the phase change type with crystal-amorphous structure of TeOx with Su and Ge additives, or of crystal-crystal structure of SeInSb, or of the semiconductor-metal structure of $VO_2$ thin film. In the following, the record bearing medium that has used the change of reflectivity of the two states of the crystal-amorphous phase change type.

The not yet recorded portion of the record bearing medium is in the crystal state. When this is irradiated with the laser beam, as the temperature of the irradiated portion increases, it melts. Then when the irradiation is stopped and rapid cooling is applied, it becomes an amorphous state. That portion which has become the amorphous state is the recorded portion. The thus recorded recording medium is the amorphous state in the recorded portion and the crystal state in the not yet recorded portion. In the case that reproduction is applied to the record bearing medium having these two states, a light beam for reproduction is irradiated to the record bearing medium, discrimination between the recorded and the not recorded is made by detecting the reflectivity to the irradiated light in the two states or the crystal state and the amorphous state. The thing of this recording method is the thing of the rewritable type. By returning this rewritable type record bearing medium to the crystal state, the recorded portion is erased. So, a recorded portion of the amorphous state can be made up again by carrying out the laser beam irradiation for writing.

Also, though similar to that described above in the point of reaction by the heat of the laser beam, recording is effected physically or chemically by the difference of the film of the surface of material. These are called "WORM: write once read many" type.

As the thing of this WORM type, it can not always be the disc-shaped record bearing medium. One surface of a card of the same size as that of the publicly known credit card can be recorded by the method that a plurality of optical-heads mounted on a rotary drum alternately record on the card.

As this method of physically recording by the head of the laser beam, bits are provided by the head of the laser beam in the material of TeC, $CS_2$-Te, Tb-Te-Se and TeTiAgSe, etc. to effect physical recording.

Also, as the method of chemically recording, there is a method of recording by chemically changing the reflectivity that is the property of the record bearing medium by the heat of the laser beam to a material obtained by doping Ab, Au in $TeO_2$ to accelerate the speed of reaction, or materials of Bi $Te_3$-$Sb_2Se_3$, etc.

As materials other than the Te system, there are materials of bubble mode such as $InCH_4O_2$, moss eye mode, and other organic pigment system materials, which are usable in the physical recording method.

In the following, as the method of recording by physical change such as formation of a difference of the film of the surface of material by light, an example of TeC is described by reference to FIG. 10.

Figure 10:
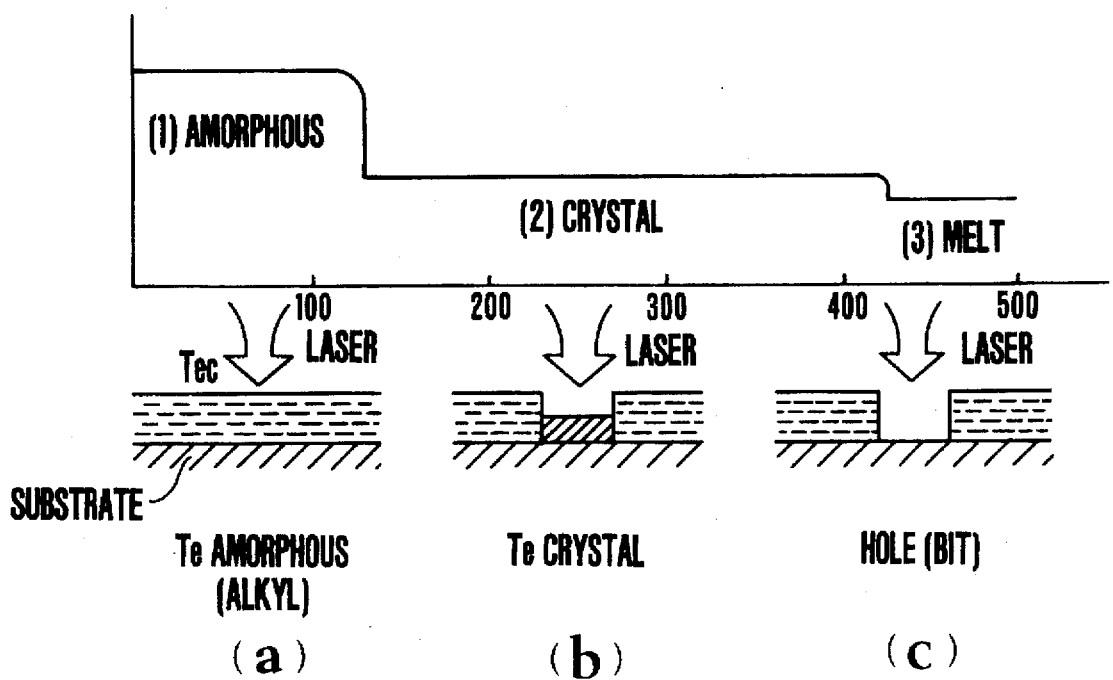
FIG. 10 is diagrams to explain a process for recording by changing physics with the use of light.

At first, as a part (a) of FIG. 10, a laser beam is irradiated to the film of the material surface. Then, by the head of this laser beam, it is heated to about 140° C. at which the alkyl molecule groups evaporate. As shown by a part (b) of FIG. 10, the Te fine particle groups remain, becoming crystalline. Further, when the irradiation of the laser beam continues, it melts at 440° C. and a bit is formed as shown in a part (c) of FIG. 10.

Next, as to the method of recording chemically, there are two chemical recording methods, one of which is to record by the amorphous-crystal phase change, and the other of which is to record by alloy (changing the reflectivity).

The recording by the amorphous-crystal phase change uses TeOx (x=1.1 at optimum) as the material of the recording medium. So, Te and $TeO_2$ are vacuum evaporated separately from the respective vacuum evaporation ports. The film after the vacuum evaporation has a structure that Te particles of about several tens of Å are uniformly dispersed in the amorphous or $TeO_2$ matrix. When the laser beam is irradiated to this material, the amorphous melts and, when cooled, becomes crystal. And, while when in the amorphous the reflectivity for the laser beam was 20%, the crystal gains a reflectivity of 40%.

Figure 11:
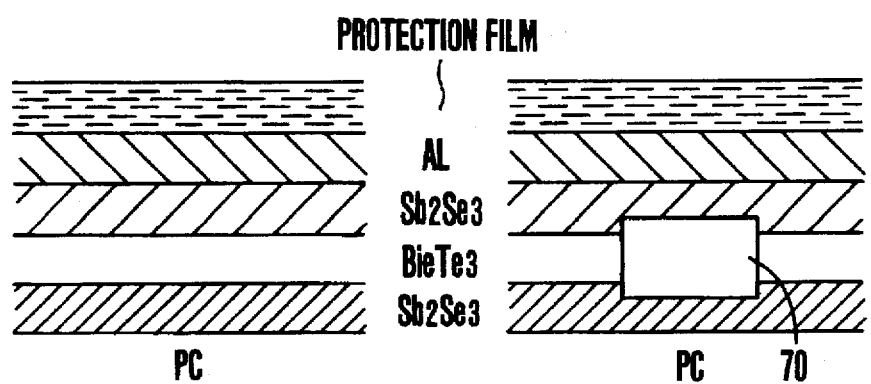
FIG. 11 is diagrams to explain a process for recording by changing the reflectivity on the record bearing medium.

Next, the method of changing the reflectivity by making alloy is described according to FIG. 11. The recording medium is constructed in the structure of $Bi_2Te_3$ of large light absorption coefficient sandwiched between two layers $Sb_2Se_3$ of small light absorption coefficient with an Al layer at the top, totaling 4 layers, and the front surface being coated with a protection film. When recording on this 4-layer recording medium, the laser beam is irradiated to the recording medium. Thereby the heated $Bi_2Te_3$ by the heat of the laser beam diffuses into $Sb_2Se_3$ lying in its upper and lower layers to make an alloy 70, thus carrying out the recording.

Since other physical recording methods using ones of the bubble mode using $InCH_4O_2$ as other than the Te system, and other organic pigment system materials, all are the publicly known techniques, their explanation is omitted.

It should be noted that when reading the record bearing medium recorded by a recording method using Kerr effect, the reading has to be made through the analyzer, but the others which are read by detecting the strength of reflection does not necessitate the analyzer. Therefore, in the case of a reproduction from the record bearing medium by using the magneto-optical effect, the laser beam for reading is detected through the analyzer, while when to read the other record bearing medium, detection is made not through the analyzer.

Since the record bearing media on which signals have been recorded by all the above-described methods, regardless of whether the information recorded is unable to rewrite or the information recorded is able to rewrite, can be reproduced by the light signal corresponding to the strength of reflection of the irradiation light, the structure of the system is simplified and they become applicable to various purposes.

Figure 12:
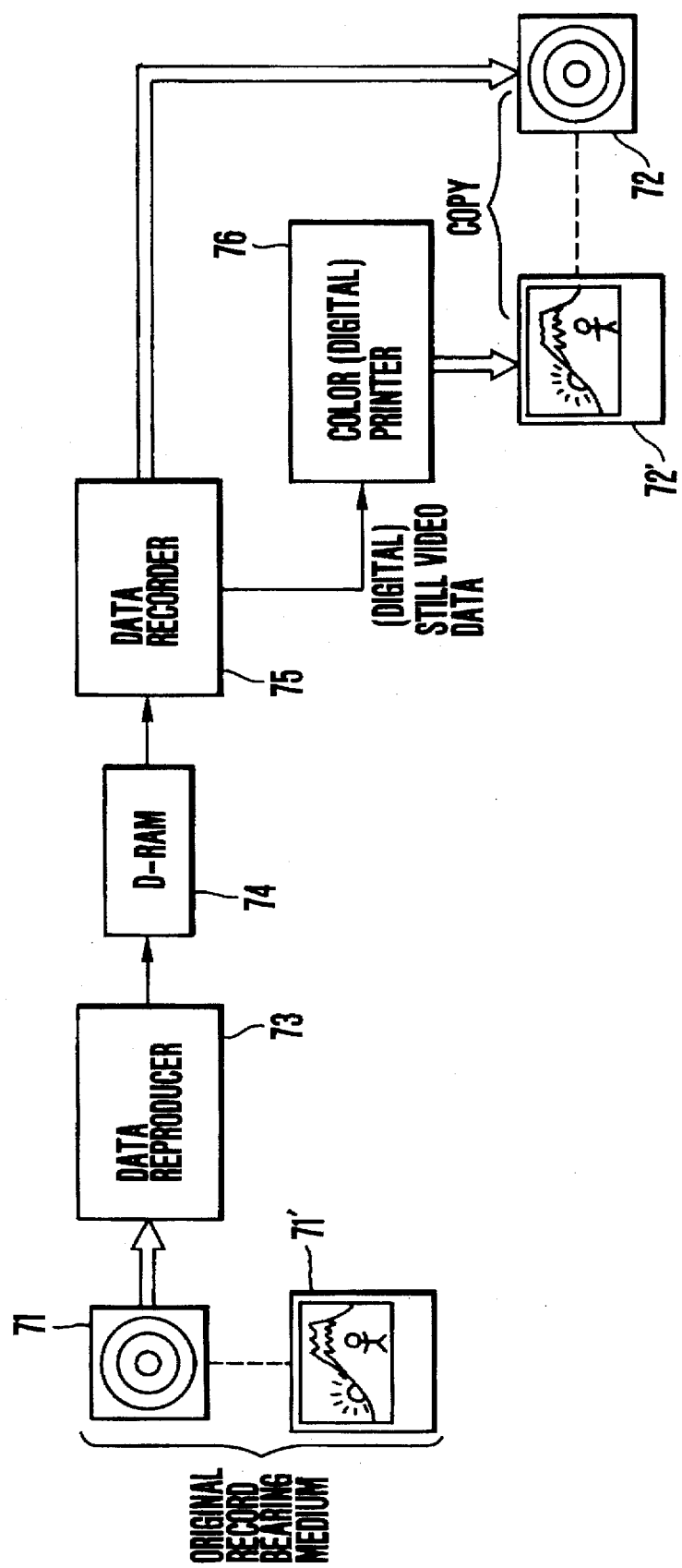
FIG. 12 is a block diagram illustrating a copy system using the record bearing medium according to the invention.

FIG. 12 is a block diagram to explain a copy system for the above-described record bearing medium. In the figure, 74 is a dynamic random access memory (D-RAM), and a data reproducer 73, a data recorder 75 and a color printer 78 correspond to the respective constituent elements in the system of FIG. 5. The first recording area 2 of the record bearing medium to be used in this copy system is provided with an ID region in which an index signal representing the number of times counting from the original record bearing medium the copy is of is written.

Now, the record information recorded on the back surface of a master record bearing medium 71 as the original and an index signal to be described later are reproduced by the data reproducer 73, and memorized in the D-RAM 74. Then, the record information memorized in this D-RAM 74 is recorded by the data recorder 75 on the back surface of another item of the medium. At this time, the numeral representing the number of copy cycles in the ID region having the index signal written therein provided at one end of the first area in which a fixed length data mainly of a still picture was recorded in the recording area of the record bearing medium 72 is incremented by 1 in the D-RAM 74. Therefore, upon seeing the information recorded in this index area, which one of the record bearing media, the given record bearing medium was copied from can be understood easily. To this purpose, it is also possible to print a desired still picture from the Still picture recording area (2 of FIG. 1) on the back side of the record bearing medium 72 directly through the printer 76, and affix the print to the front surface 72' of the record bearing medium 72. Also, the still picture print to be affixed to the front surface of this record bearing medium may be obtained by copying-the still picture print affixed to the front surface 71' of the original record bearing medium with the copier or the like.

According to the system of the Structure described above, it has a function of being able to copy from one record bearing medium to another record bearing medium, and a record bearing medium capable of determining what a number of generations counting from the original record bearing medium this record bearing medium is a copy of can be obtained.

Figure 13:
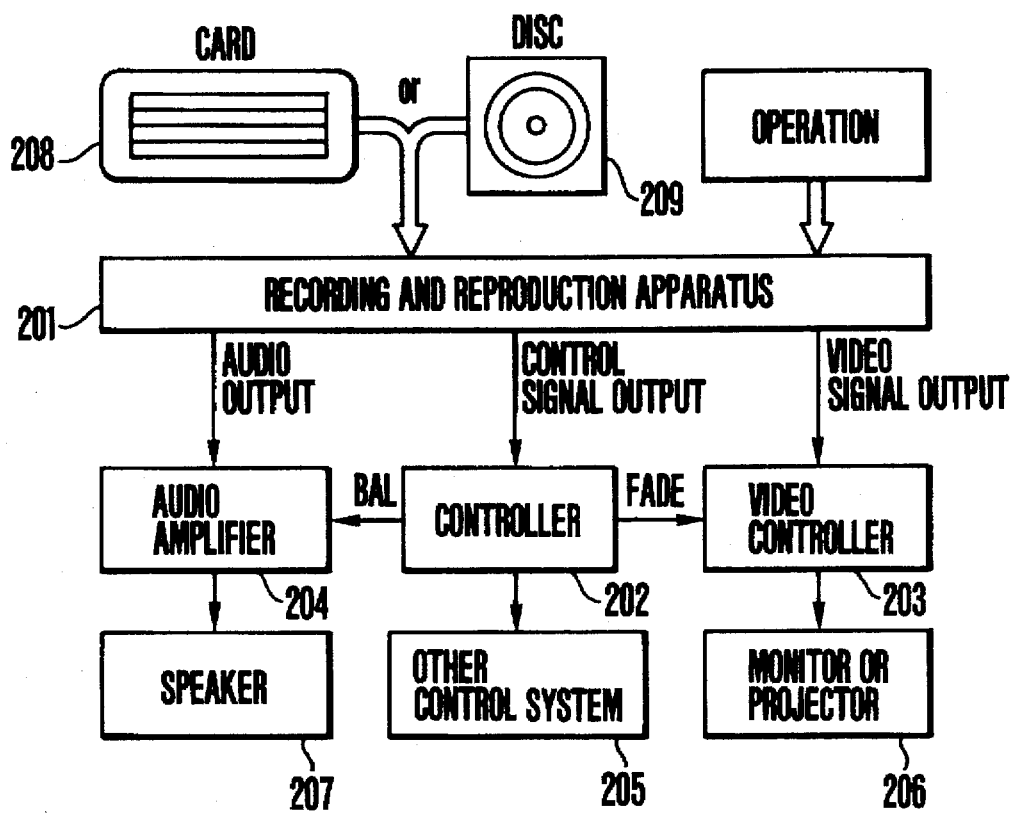
FIG. 13 is a diagram roughly illustrating the structure of a control system using the record bearing medium according to the invention.

FIG. 13 is a diagram roughly illustrating the structure of a control system using such a record bearing medium as described above. 201 is a recording and reproduction apparatus to be described later; 202 is a controller; 203 is a video controller; 204 is an audio amplifier; 205 is a control system for others; 206 is a video monitor device such as monitor TV, projector, etc.; 207 is a speaker; 208 is a card as large as the size of a portable credit card of about 55 mm×85 mm; 209 is a square disc of about 50–85 mm in side length.

In the apparatus of FIG. 13, a system is so constructed that upon insertion of the card 208 or the disc 209 into the recording and reproduction apparatus 201, a video signal output, an audio signal output and data such as controls are supplied respectively to the video controller 203, the audio amplifier 204 and the controller 202. The above-mentioned three kinds of information each are output from the video monitor (monitor TV, projector) 206, the speaker 207 and the control system 205.

Here, the controller 202 sends a FADE signal to the video controller 203, thereby it being made possible to control the luminance of all the area of the picture frame, too. Also, as to the audio amplifier 204, a similar measure may be taken so that it becomes possible to adjust the sound volume balance among a plurality of audio channels.

Figure 14A:
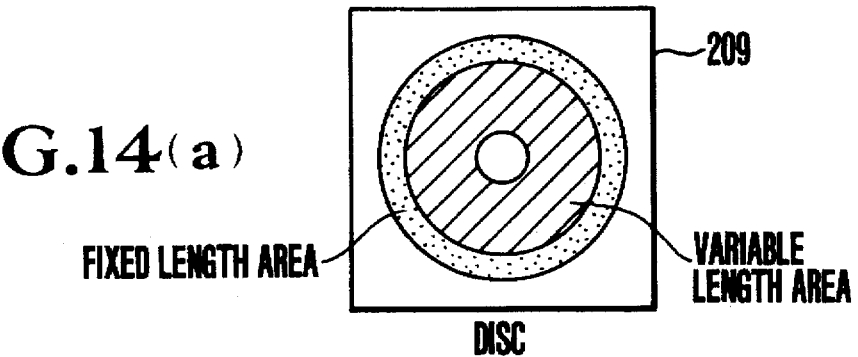
FIGS. 14(a) and 14(b) are plan views illustrating respectively practical examples of the record bearing medium usable in the system of FIG. 13.
Figure 14B:
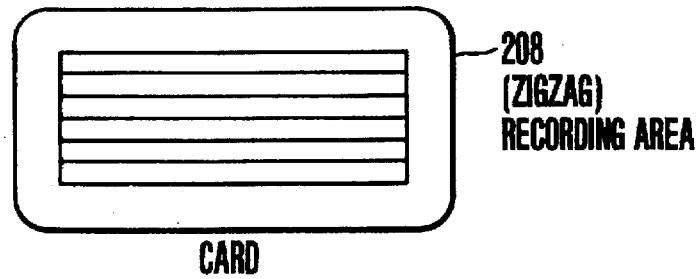

Also, FIGS. 14(a) and 14(b) show the practical structures of the record bearing media 208 and 209 of FIG. 13, FIG.

14(a) being a figure of the disc-shaped record bearing medium and FIG. 14(b) being a figure of the card-shaped record bearing medium. Though an example of a zigzag form of recording track pattern is shown in FIG. 14(b), besides this, it is also possible to array arcuate track patterns of high data rate.

By the way, as the constituent elements of this system, depending on whether the record bearing medium 208 or 209 is in the form of the card 208 or the disc 209, the arrangement of the neighborhood of the photoelectric transducer portion for the recording and reproduction becomes different. Also, there are differences of the data rate, etc. In the following, therefore, taking an example of a 3 in. square record bearing medium or the disc 209, explanation is made concretely.

Before the explanation of the system using the disc 209 as the disc-shaped record bearing medium, the record bearing medium is explained in a bit greater detail by using FIG. 14(a).

Recording is carried out, while forming a track pattern of helical shape or of shape of a plurality of concentric circles in the center of the square as viewed from the recording surface side of the disc 209. As shown in the figure, the recording area of round shape is used in divided two parts. One of them is a first recording area which is a fixed length area where a fixed volume of information is always recorded, and is provided on the recording start side. In general, for rotation control of constant linear velocity is performed, it is advantageous to use an outer peripheral side as far as possible. Hence the recording start point is set in the outermost periphery. This fixed length area is a recording area in which the recordable data amount capable of recording information of at least one still picture is constant (the number of pictures to be recorded may be changed). The other is, to be provided contiguous to this fixed length area, a variable length area generally of more inner peripheral side. This variable length area is able to set a size of the recording area depending on the amount of information to be recorded. Also, this area is suited to record time dependent information such as a motion picture and sound. In the case of the motion picture, the amount of information is too large even at as low a quality as the NTSC. Therefore, for the digital case, a high efficiency coding circuit becomes necessary. For the case of audio signals, the usual PCM coding makes the data amount proper.

Figure 15:
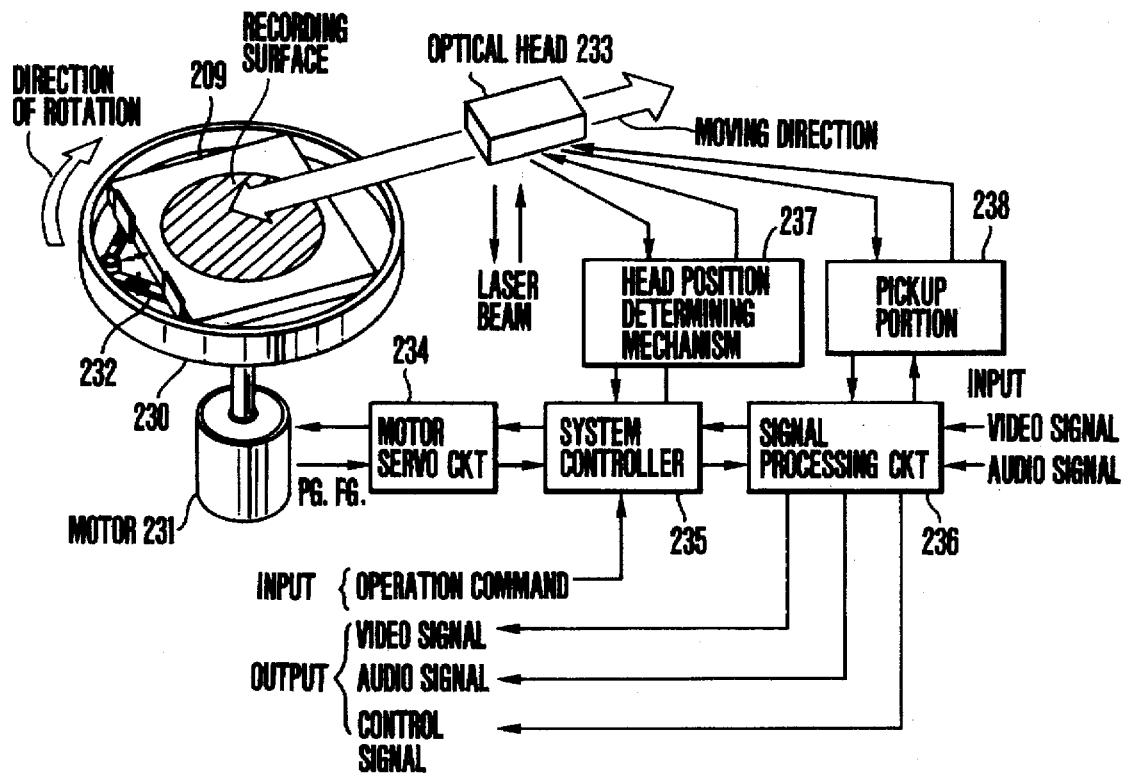
FIG. 15 is a diagram illustrating the construction and arrangement of the main parts of the recording and reproduction apparatus in FIG. 13.

Next, using FIG. 15, a concrete arrangement of the main parts of the recording and reproduction apparatus 201 of FIG. 13 is described. In FIG. 15, the disc 209 is set with its recording surface up on a turn table 230. The turn table 230 is driven to rotate by a motor 231. When rotation starts, the disc 209 is fixed secured by a stopper 232 on the turn table 230. The turn table 230 is controlled in accordance with the position of an optical head 233 by a motor servo circuit 234 on the basis of information of the number of revolutions and information of the phase of rotation produced from a frequency generator (FG) and a pulse generator (PG) linked to the motor 231 so that the relative speed of the optical head 233 and the disc 209 is made constant. Also, the optical head 233 moves in a direction indicated by the arrow to reproduce (or record) the information successively. The determination of the position of this optical head 233 is controlled by a head position determining mechanism 237 comprised of a magnetic movable coil and others.

In such a manner, the relative position of the head 233 is controlled when recording or reproducing is carried out by radiating a laser beam to the disc 209.

When in recording, spots of very minute area called bits whose reflectance characteristic is different from the others are formed on the disc 209 by using the energy of the laser beam. When in reproduction, depending on the reflection characteristic of the irradiated laser beam, a "0" is obtained if there is no change in the characteristic, or "1" is change occurs, detection is made in the form of digital signal. And, the differentiate the reflection characteristic there are methods that holes are bored to generate diffraction, causing the strength of reflection to lower, that the phase of the medium material is change to change the strength of reflection, and that the Kerr rotation angle is changed by using the magneto-optical effect. Any of them may be employed.

Also, a pickup portion 238 is provided on the optical head 233 and has, for example, a 4-component photoelectric transducer of PIN photodiodes to detect the information signals. The detected information signals are sent to a signal processing circuit 236, wherein they are converted to necessary signal forms, and are output therefrom as the video signal, the audio signal and the control signals. Further, in this signal processing circuit 236, to form a tracking control signal for the head position determining mechanism 237, a signal from the pickup portion 238 is supplied as the tracking signal to a system controller 235. This system controller 235 controls not only determination of the position of the optical head 233 but also the motor servo circuit 234.

Figure 16:
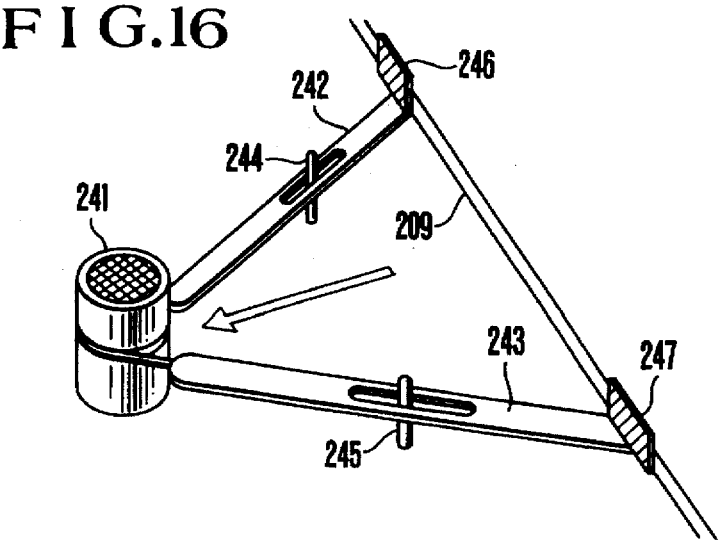
FIG. 16 is a perspective view illustrating the details of the stopper in FIG. 15.

FIG. 16 is a perspective view illustrating the details of the stopper 232 of FIG. 15. In FIG. 16, arms 242 and 243 movably provided on support shafts 244 and 245 have disc presser plates 246 and 247 at their one ends, the opposite ends of which have a common weight 241. This weight 241 is attracted by a spring (not shown) to a nearer position to the disc 209. For this reason, the presser plates 246 and 247 are put in such positions that the disc 209 is freely set on the turn table 230. When the disc 209 is set on the turn table 230 and rotation is started, the weight 241 is moved by the centrifugal force to a direction indicated by arrow in FIG. 16. This causes the arms 242 and 243 to move so that the presser plates 246 and 247 press and fixedly secure the disc 209.

Figure 17B:
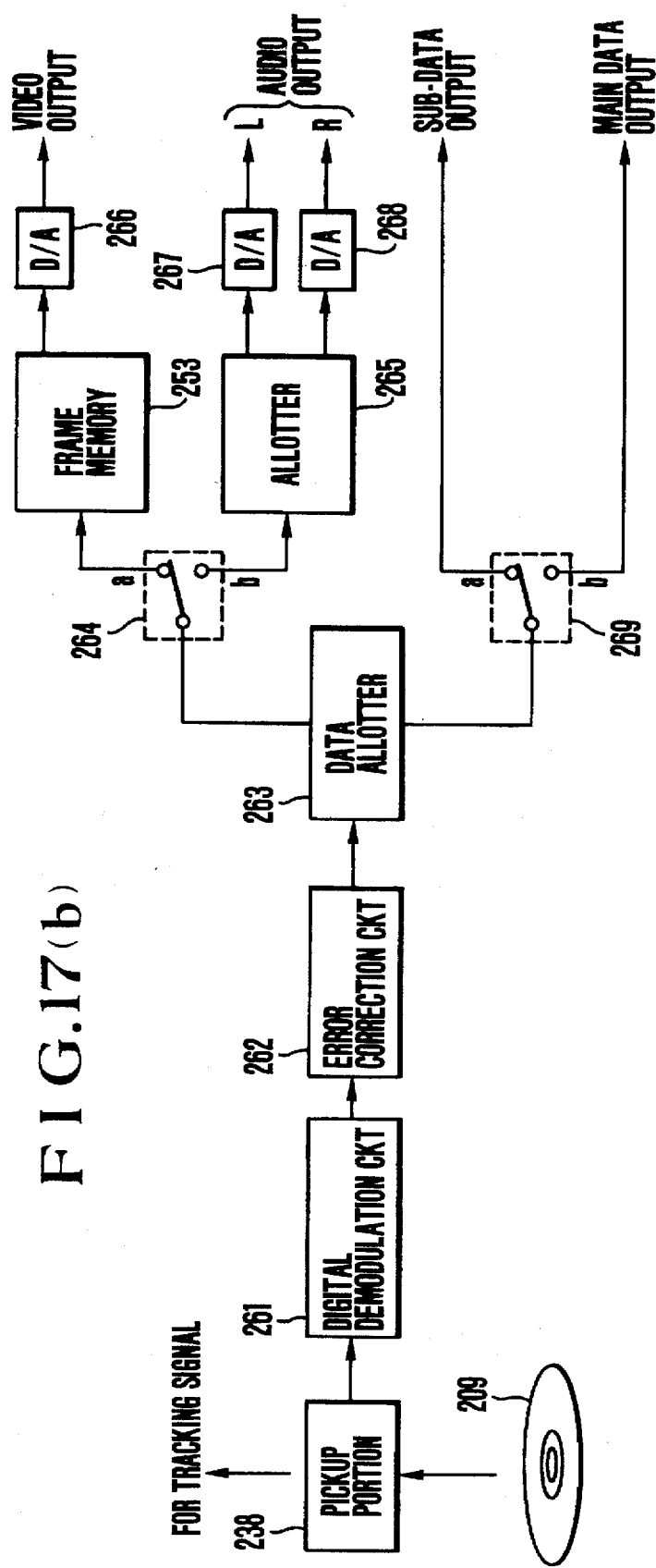

FIGS. 17(a) and 17(b) are block diagrams illustrating the construction and arrangement of the parts of the signal processing circuit 236 of FIG. 15, FIG. 17(a) illustrating a signal processing system for the recording and FIG. 17(b) illustrating a signal processing system for the reproduction.

In FIGS. 17(a) and 17(b), a video signal and stereo audio signals are converted ,to digital form by A/D converters 250, 251 and 252 respectively. The video signal for one frame is stored in a frame memory 253, while the audio data as the parallel signals of stereo are converted to a serial data by a multiplexer circuit 254. In a switch 255, depending on the recording area, the data is selected. In an adder 257, the selected data is mixed with the output signal from another switch 256. The inputs of the switch 256 are the main data and the sub-data, and are selectively output according to the necessity. The switches 255 and 256 are changed over between a terminal "a" side when recording on the fixed length area and a terminal "b" side when recording on the variable length area.

Incidentally, it is considered that the main data includes MIDI data to be described later and others, and the sub-data include data for initial settings, user's code and others.

Figure 18:
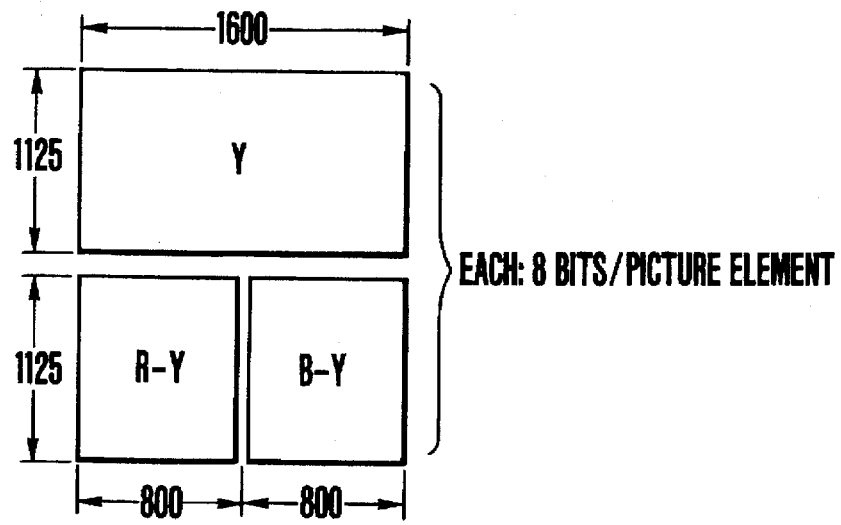
FIG. 18 is a plan view illustrating the arrangement of picture elements for a still picture signal to be recorded on the record bearing medium of FIG. 14(a).

FIG. 18 is a diagram illustrating the element arrangement of the still picture signal recorded in the fixed length area or first recording area on the disc 209 shown in FIG. 14(a). Y denotes the luminance signal, and R-Y and B-Y each are a color difference signal. Each picture element consists of 8 bits.

By setting the sampling frequency so as to obtain the picture elements shown in FIG. 18, an equivalent image, quality to the high-definition TV can be obtained. If the image quality may be as rough as corresponding to the NTSC system, on the other hand, a sampling frequency equal to 3–4 times the color subcarrier frequency fsc is sufficient.

Figure 19:
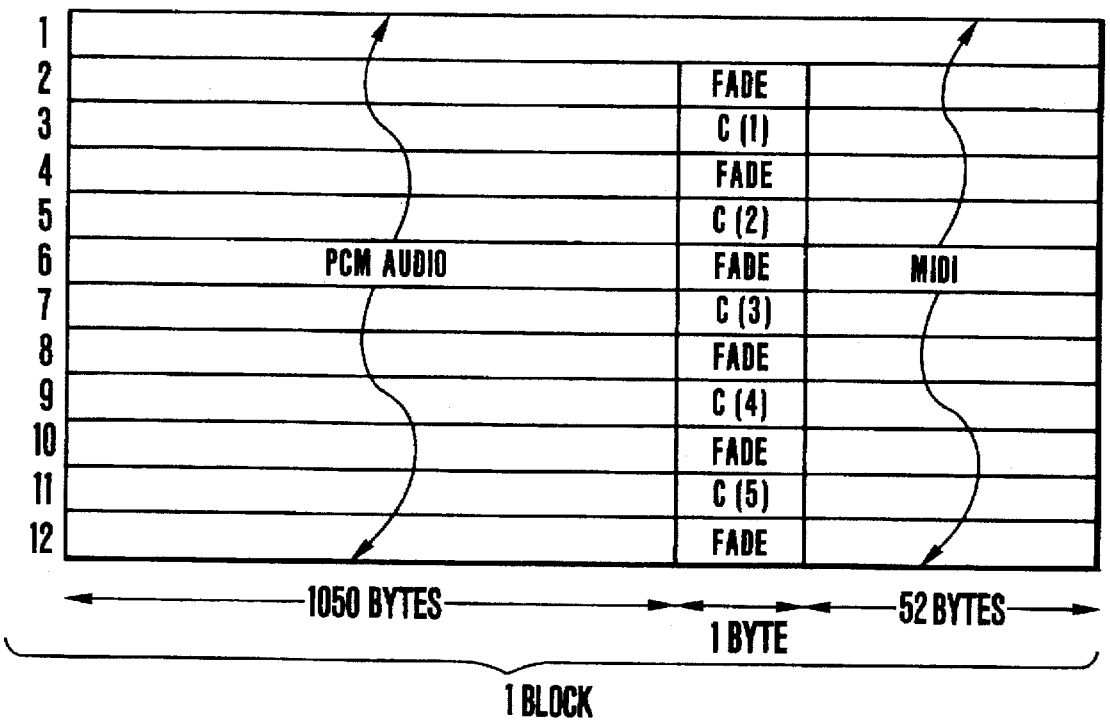
FIG. 19 is a diagram illustrating a record format for MIDI signals and audio signals to be recorded on the record bearing medium of FIG. 14(a).

FIG. 19 is a diagram illustrating a data array for ⅕ second in the variable length area or second recording area on the disc 209 shown in FIG. 14(a), for a case that as an example of the main data, the MIDI signal as the audio signal is digitized at a sampling frequency of $2f_H$ (where $f_H$ is the horizontal synchronous frequency.) Its content is shown below:

Audio 31.5k sampling
MIDI 31.25k bits/sec.
FADE 1 byte per frame
Others 200 bits/sec.

From the above, in the example of FIG. 18, about 5M bytes are assigned to one frame of still picture, and in the example of FIG. 19, about 5M bytes are used up per minute. Therefore, the initial system design is easily carried out.

Figure 20:
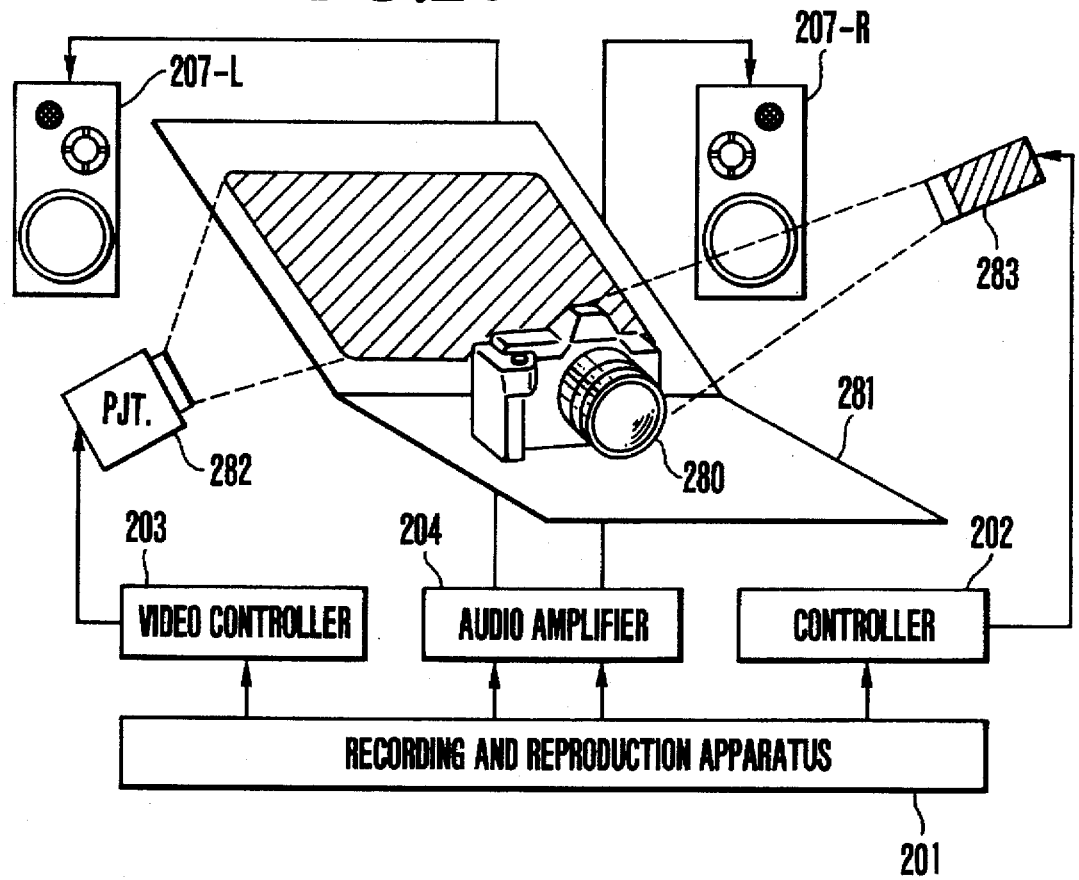
FIG. 20 is a diagram illustrating an example of application of the control system of FIG. 13.

FIG. 20 shows arrangement of a system of the case that the system of FIG. 13 is applied to a shopwindow display (POP) system. 280 is a camera as the commodity for display; 281 is an exhibition table which also serves as a screen; 282 is a video projector for outputting the video signal, this video being projected onto the screen 281 on the basis of the signal of the video controller 203. 283 is a lamp for illumination, which is controlled in accordance with the before-mentioned other data (C(1) of FIG. 19) by the controller 202. Since this data have 200 bits/sec. if the on-off control is 100 msec., up to 20 lamps can be controlled. The audio signal passes through the audio amplifier 204, and is output as the sound signals by speakers. 207-R, 207-L.

The brilliance of the projected still picture by this projector 282 can be determined in each frame by the FADE data. If the data setting is changed, a color fade also becomes possible.

Figure 21:
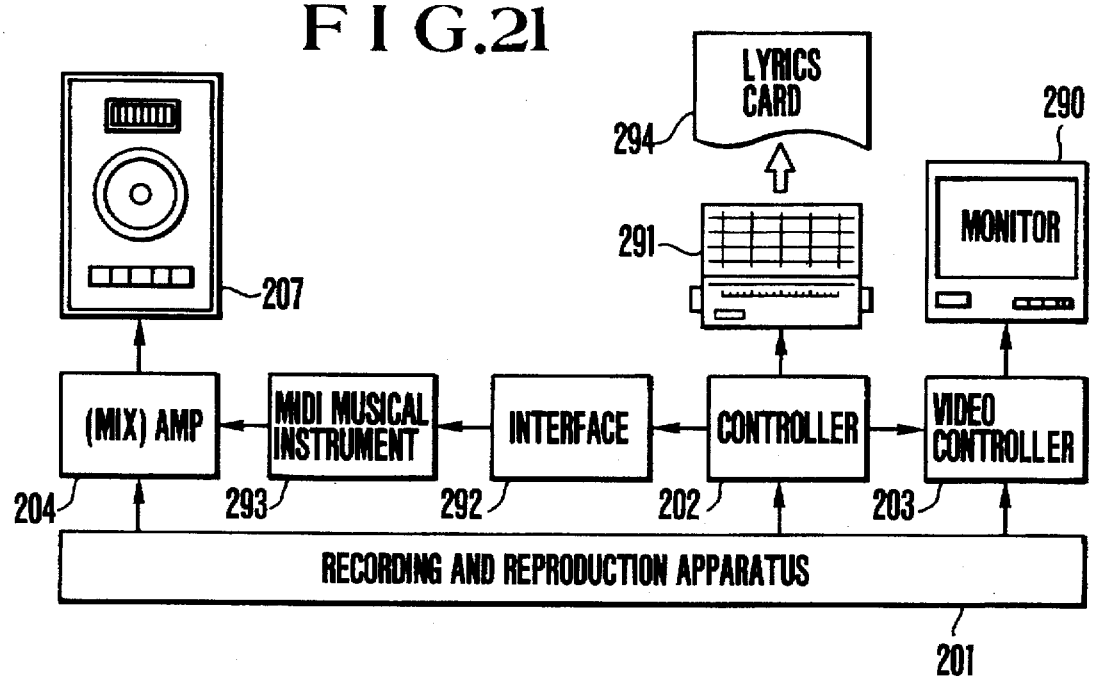
FIG. 21 is a diagram illustrating another example of application of the control system of FIG. 13.

FIG. 21 is a block diagram roughly illustrating arrangement of a system of the case that the system of FIG. 13 is applied to a sound reproduction system, wherein the audio signal and the Video signal are output in a similar manner to that in the case of FIG. 20. This characteristic feature resides in transmission of the main data according to the MIDI standard.

Incidentally, MIDI is short for Musical Instrument Digital Interface. To control the electronic musical instruments, the international standard has been set forth by musical instrument makers in various countries. Recently, however, as personal computers (particularly MSXs) are widely spreading, it begins to be applied to other purposes than the electronic music instruments, thus providing a format of high worth in utility. And, the data rate of this MIDI is 31.25 bits/sec. and the minimum unit is 10 bits. This is because a start bit and an end bit are added to 1 byte of data at the head and tail thereof, for transmission is made in units of 10 bits. In this system, however, the net data of 8 bits suffice. Therefore, when recording, the two bits, the start and the end, are removed. When reproducing, the start and end bits are added again to send out the data in the form of the MIDI format. This conversion is performed by an interface 292, and the result is supplied to an MIDI adopted electronic musical instrument for producing music (the form may be that of the mere audio system). And, the audio signal produced from this MIDI adopted electronic musical instrument 293 in mixture with the before-mentioned audio signal is amplified by the audio amplifier 204, and output from the speaker 207. Also, if the other data (C(1) of FIG. 19) supplied to the controller 202 is used as the code data, musical scores, lyrics, etc. can be transmitted. So, with the controller 202 connected to a printer 291, lyrics cards 294 can be printed out. If the character data are supplied in superimposed relation to the video controller 203, the still picture and the lyrics can be viewed in superimposed relation on the monitor 290.

By the way, on connection of the audio amplifier 204 further to a microphone (not shown), a system can be set up to help sing a song while looking at the lyrics and hearing the background music.

What is claimed is:

1. A processing system for processing a recording medium having n-bit control signal, n-bit audio signal and n-bit video signal recorded thereon, comprising:

(a) reproducing means for reproducing said control signal, audio signal and video signal from said recording medium;

(b) converting means for converting said control signal reproduced by said reproducing means into a signal consisting of units of (n+2) bit by adding a start bit and a stop bit to each control signal;

(c) display means for displaying an image corresponding to the video signal reproduced by said reproducing means;

(d) voice generating means for generating a voice corresponding to said audio signal reproduced by said reproducing means; and (e) first control means for modifying the image displayed by said display means in response to a signal outputted from said converting means.

2. A system according to claim 1, further comprising:

second control means for modifying the voice generated by said voice generating means in response to a signal outputted from said converting means.

3. A system according to claim 1, wherein said first control means includes means for generating a character signal in response to a signal outputted from said converting means, and said display means is arranged to display an image corresponding to the video signal reproduced by said reproducing means on which a character corresponding to said character signal is superimposed.

4. A processing method for processing a recording medium having n-bit control signal, n-bit audio signal and n-bit video signal recorded thereon, comprising steps of reproducing the control signal, the audio signal and the video signal from the recording medium;

converting the reproduced control signal into a signal consisting of units of (n+2) bits, by adding a start bit and a stop bit to each control signal;

displaying an image corresponding to the reproduced video signal;

generating a voice corresponding to the reproduced audio signal;

modifying the image displayed in response to the converted control signal.

5. A method according to claim 4, further comprising a step of modifying the voice to be generated in response to the converted control signal.

6. A method according to claim 4, wherein said modifying step includes a step of generating a character signal in response to the converted control signal, and displaying in said displaying step, an image corresponding to the reproduced video signal on which a character corresponding to the character signal is superimposed.

7. A reproducing device for reproducing n-bit control signal, n-bit audio signal and n-bit video signal recorded on a recording medium, comprising:

reproducing means for reproducing the control signal, the audio signal and the video signal from the recording medium;

converting means for converting the control signal reproduced by said reproducing means into a signal consisting of units of (n+2) bits, by adding a start bit and a stop bit to each control signal;

control means for controlling the video signal reproduced by said reproducing means in response to the control signal converted by said converting means;

first output means for outputting the video signal controlled by said control means so as to be displayed as an image; and second output means for outputting the audio signal reproduced by said reproducing means so as to be generated as a voice.

8. A device according to claim 7, further comprising means for controlling the audio signal reproduced by said reproducing means in response to the control signal converted by said converting means.

9. A device according to claim 7, wherein said control means includes means for generating a character signal in response to the control signal converted by said converting means, and said first output means outputs an image corresponding to the reproduced video signal on which a character corresponding to the character signal is superimposed.

10. A reproducing method for reproducing n-bit control signal, n-bit audio signal and n-bit video signal recorded on a recording medium, comprising steps of reproducing the control signal, the audio signal and the video signal from the recording medium;

converting the reproduced control signal into a signal consisting of units of (n+2) bits, by adding a start bit and a stop bit to each control signal;

controlling the reproduced video signal in response to the converted control signal;

outputting the controlled video signal so as to be displayed as an image; and outputting the reproduced audio signal so as to be generated as a voice.

11. A method according to claim 10, further comprising a step of controlling the reproduced audio signal in response to the converted control signal.

12. A method according to claim 10, wherein said controlling step includes a step of generating a character signal in response to the converted control signal, and an image is output corresponding to the reproduced video signal on which a character corresponding to the character signal is superimposed.

* * * * *

UNITED STATES PATENT AND TRADEMARK OFFICE
CERTIFICATE OF CORRECTION

PATENT NO. : 5,680,500
DATED : October 21, 1997
INVENTOR(S) : Takahashi, et al

It is certified that error appears in the above-indentified patent and that said Letters Patent is hereby corrected as shown below:

Col. 3, line 62, delete "Securing" and insert -- securing --.

Col. 4, line 15, delete "pictue a code" and insert -- picture, a code --.

Col. 4, line 52, delete "terminal b side" and insert -- terminal "b" side --.

Col. 4, line 59, delete "a side" and insert -- "a" side --.

Col. 5, line 58, delete "Out" and insert -- out --.

Col. 6, line 63, delete "126'" and insert -- 126 --.

Col. 10, line 27, delete "Still" and insert -- still --.

Col. 10, line 35, delete "Structure" and insert -- structure --.

Col. 12, line 6, delete "or "1" is" and insert -- or "1" if --.

UNITED STATES PATENT AND TRADEMARK OFFICE
CERTIFICATE OF CORRECTION

PATENT NO. : 5,680,500
DATED : October 21, 1997
INVENTOR(S) : Takahashi, et al

It is certified that error appears in the above-indentified patent and that said Letters Patent is hereby corrected as shown below:

Col. 12, line 8,    delete    "the differentiate"   and insert   -- to differentiate --.

Col. 13, line 45,   delete    "Video"   and insert   -- video --.

Signed and Sealed this

Twenty-third Day of June, 1998

Attest:

BRUCE LEHMAN

Attesting Officer    Commissioner of Patents and Trademarks